COMPUTING DEVICE

Filed Oct. 28, 1958

INVENTOR.
GLENN W. PRESTON
BY
Jacob Trachtman
ATTORNEY.

United States Patent Office 3,100,943
Patented Aug. 20, 1963

3,100,943
COMPUTING DEVICE

Glenn W. Preston, Oreland, Pa., assignor to General Atronics Corporation, Bala-Cynwyd, Pa., a corporation of Pennsylvania Filed Oct. 28, 1958, Ser. No. 770,051
17 Claims. (Cl. 35—30)

Figure 2:
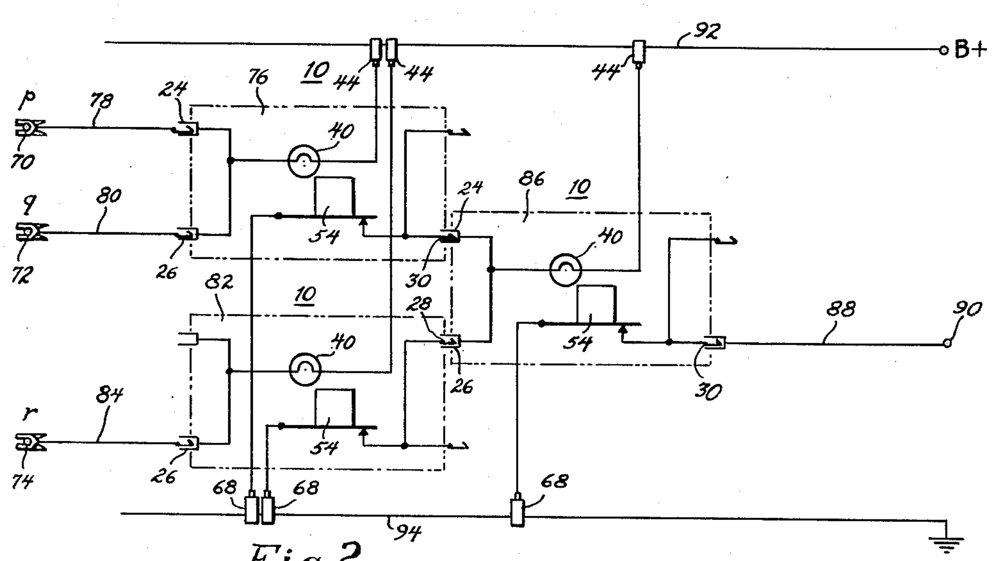

This invention relates to a computing device and more particularly to a modular computing device for Boolean functions.

Heretofore, computers have been provided which have been highly complex in nature and expensive in cost. The expense of such prior art devices is inherent in their automatic operation and the expensive components utilized.

It is therefore a principal object of the invention to provide a new and improved computing device of the modular type which is highly simplified in form and subject to manual operation.

Another object of the invention is to provide a new and improved computing device of a modular nature which may be combined with other identical devices to form selected Boolean functions.

Another object of the invention is to provide a new and improved modular computing device which is highly instructive in operation and can be utilized as an educational and amusement device.

Another object of the invention is to provide a new and improved modular computing device comprising a plurality of units which are readily interconnected to form any Boolean function or combinations of functions desired for computing and solving such problems.

Another object of the invention is to provide a new and improved modular computing device which is elementary in nature, easily manufactured, and inexpensive in cost.

The above objects of the invention are achieved by providing a computing device comprising a signal input lead, a signal output lead and first and second voltage supply leads. A bulb is connected between the signal input lead and the first voltage supply line for indicating the presence of a signal on the input lead, and the manual switching means is connected between a signal output lead and the first voltage supply line for controlling the delivery of a signal to the output lead in response to the indication of the bulb. The input and output leads are provided with respective pairs of complementary detachable terminals for interconnecting identical computing devices with the output lead of one of said devices being adapted for connecting with the input lead of another of said devices.

To achieve such interconnections the components of the device are supported on a mounting board having a front edge along which are positioned in spaced relationship the terminals of the input leads and a rear edge along which are positioned in spaced relationship the terminals of the output leads.

A shield is connected with the switching means of the computing device for screening the light of its bulb when the switching means is in its open position. The device normally has its switching means in the closed position and is manually actuated to its open position upon the energization of its bulb.

A pair of power supply busses maintained at different potentials are provided for supplying power respectively to the first and second voltage supply leads.

Identical computing devices may be interconnected by means of the complementary detachable terminal to form various mathematical functions, such as the elementary negation, disjunction and conjunction functions of Boolean algebra. Such elementary functions may be combined to formulate highly complex functions.

Figures 1, 3:
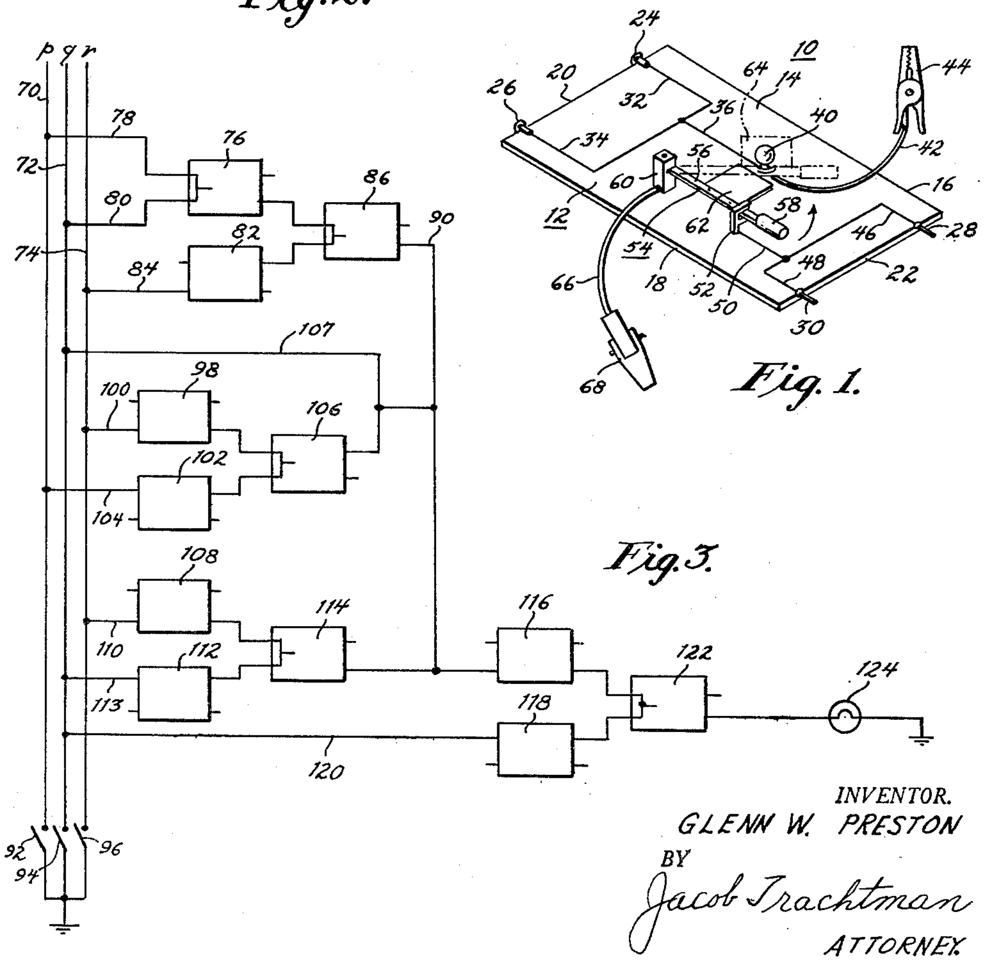

The above objects as well as many other objects of the invention will become more apparent as the following detailed description of the invention is read in conjunction with drawings, in which:

FIGURE 1 is a perspective view of a computing device embodying the invention,

FIGURE 2 diagrammatically illustrates in schematic form a plurality of computing devices interconnected to form a Boolean function, FIGURE 3 diagrammatically illustrates in block form the combination of a plurality of computing devices for solving a particular logical problem.

Like reference numerals designate like parts throughout the several views.

The FIGURE 1 discloses a computing device 10 embodying the invention. The device 10 comprises a mounting board 12 having a top supporting surface 14, upper and lower edges 16 and 18 and front and rear edges 20 and 22. The surface 14 of the board 12 supports in spaced relationship along its edge 20 a pair of female input connector terminals 24, 26, while the member 12 supports in spaced relationship along its rear edge 22 a pair of male terminal connecting terminals 28, 30.

The input leads 32 and 34 are supported by the surface 14 of the board 12 and respectively connect the upper terminal 24 and lower terminal 26 with a conductor or line 36. The line 36 is connected through an electric bulb 40 to a flexible line 42 which is terminated by an alligator clip 44.

The line 36 and bulb 40 are supported by the member 12, while the line 42 is connected at one end only leaving its clip end freely movable.

A pair of output leads 46 and 48 respectively connect the upper and lower terminals 28, 30 with a conductor 50 that joins the contact terminal 52 of a manual open-close switch 54.

The switch 54 includes a connecting blade 56 which has a handle 58 at one end that is pivoted at the other end with its terminal 60. The blade 56 electrically connects the terminals 52, 60 of the switch 54 when it is in its on or closed position as shown in FIGURE 1. The blade 56 is also provided with an extending substantially rectangular shield 62 which may be positioned over the bulb 40 to shield its radiation when the switch 54 is in its open position as shown by the dashed lines at 64. The switch 54 is mounted and positioned on the board 12 to achieve this function.

The terminal 60 of the switch 54 is connected with a flexible extending line 66 which has an alligator clip 68 at its end.

In operation, the female terminals 24, 26 and male terminals 28, 30 of the computing device 10 are spaced and adapted for engaging the complementary male and female terminals of identical computing devices 10 which are positioned preceding and following any particular computing device 10. The alligator clips 44 and 68 are also adapted for connecting between suitable voltage potentials as will be more particularly illustrated in connection with FIGURE 2.

The FIGURE 2 illustrates in schematic form a plurality of devices 10 which are interconnected to form the Boolean function $$[(pVq)\cdot r]$$

It is noted that the expression has three variables $p$, $q$, and $r$. These variables may have a value of either zero or one. Thus the three signal input busses 70, 72 and 74 respectively represent the variables $p$, $q$, and $r$. The presence of the signal on the respective busses 70, 72 and 74 may thus represent the value 1, while the absence of the signal represents the value 0. Similarly, a one may represent the truth of a proposition *p*, *q* or *r*, while the zero may deny or indicate that the proposition is false.

To provide the above function, the left device 76 may have its upper forward terminal 24 detachably connected by a conductor 78 with the *p* input bus 70, while its lower input terminal 26 is joined by a conductor 80 with the *q* input bus 72. The lower left computing device 82 has its lower forward terminal 26 detachably connected by an electrical connector 84 with the *r* input bus 74.

The computing device 86 positioned to the right of the devices 76, 82 has its upper forward input terminal 24 detachably connected with the complementary lower rear output terminal 30 of the device 76, while its lower input terminal 26 detachably connects with the upper rear terminal 28 of the device 82. The lower rear output terminal 30 of the device 86 may be detachably connected by a conductor 88 to an output signal terminal 90.

Each of the alligator clips 44 of the computing devices 76, 82 and 86 is connected to a common positive potential bus 92 which is connected to a potential B which is positive with respect to ground potential. Similarly, the alligator clips 68 of the computing devices 76, 82 and 86 are connected to a common potential bus 94 which is maintained at ground potential.

In operation with the devices 10 connected as shown in FIGURE 2 and all of the switches 54 in their closed positions, the presence of a signal on either the *p* or *q* busses 70, 72 results in the energization of the bulb 40 of the device 76. When the bulb 40 lights, the operator actuates the switch 54 to its open position to shield the radiation from the bulb 40. Similarly, if a signal is present on the *r* input bus 74, the bulb 40 of device 82 is activated, requiring the operator to actuate the switch 54 to cover the bulb 40 of the device 82.

The bulb 40 of the succeeding device 86 will be energized only if either one of the switches 54 of the devices 76, 82 is closed. If the bulb 40 is thus energized, the operator manually opens the switch 54 of device 86 preventing the delivery of a ground potential signal to the output terminal 90.

An analysis of this arrangement will show that it represents the Boolean function $$[(pVq)\cdot r]$$

For instance, a signal on either of the *p* or *q* input busses 70, 72 results in opening of the switch 54 of device 76 preventing the delivery of a ground potential signal to the bulb 40 of device 86 through the computing device 76. Similarly the presence of a signal on the *r* input bus 74 results in the opening of switch 54 of device 82 which also prevents the delivery of ground potential to the bulb 40 and device 86.

With the bulb 40 of device 86 in its unenergized position, the switch 54 of device 86 is maintained in its closed condition and a ground potential signal is delivered to the terminal 90. This corresponds to the presence of the signal and the truthfulness of the proposition of the Boolean function formulated. Conversely, the absence of a signal on both of the *p* and *q* input busses 70, 72 prevents the energization of the bulb 40 of the device 76. This requires the switch 54 to remain in its closed position delivering a signal to the bulb 40 of device 86 causing its illumination. The energization of the bulb 40 of the device 86 requires the opening of a switch 54 and the resulting absence of a signal at the output terminal 90.

In a like manner the absence of an input signal to the *r* input bus 74 requires that the switch 54 of device 82 be maintained in its closed position. This similarly results in the energization of the bulb 40 of the device 86, also resulting in the absence of an output signal to terminal 90.

It is noted that in the manual operation of the device, the truthfulness of a combination of input signals *p*, *q* and *r* representing the variables of the formulated Boolean expression represented by the particular connection and arrangement of the computing devices 10 is determined after an operator systematically actuates the switches 54 of those devices 10 which have their bulbs 40 illuminated. It is noted that this process of switch actuation should proceed from the left so that those devices which are closest to the input signals of the input busses 70, 72 and 74 are actuated first. This is because after such actuation, succeeding devices 10 may have their bulbs automatically extinguished, thus not requiring actuation of their corresponding switches. If after the operation is completed, a signal is presented at the output terminal 90, the Boolean expression is true for the particular input signals presented. If no signal is presented for certain combination of input signals, then the Boolean expression asserts the falsity of the presented input signals or propositions.

Refer now to FIGURE 3 in order to illustrate in block form the formulation of a more highly complex Boolean function including the combination of the basic Boolean functions of negation, disjunction and conjunction.

Negation is provided by a single device 10, since the presence of an input signal to an input terminal 24, 26 results in the delivery of no signal at its output terminals 28, 30.

The disjunction function, is achieved by the delivery of an output signal upon the delivery of an input signal to either of two terminals. This is provided by the pair of input terminals 24, 26 of the device 10 which are each connected with the conductor or line 36. Thus delivery of the signal to either of the terminals 24 or 26, provides a signal on the line 36. The conjunction function is provided by the arrangement of devices shown in FIGURE 2, since the signal *p* and *r* must be present at the same time or in conjunction to provide an output signal to the terminal 90, with line 80 removed.

For the example, the following Boolean function is formulated and illustrated in FIGURE 3:

$$\{[(pVq)\cdot r]V[(r\cdot p)Vq]V[r\cdot q]\}\cdot q$$

The function within the first square brackets is that illustrated and formulated in FIGURE 2 and is correspondingly represented by the devices 76, 82, 86 and their appropriate connections with the input busses 70, 72 and 74 as shown in FIGURE 3. The input busses 70, 72 and 74 are selectively connected by respective switches 92, 94, 96 to ground potential. The closing of the respective switches 92, 94, 96 respectively provides the input busses 70, 72 and 74 with the presence of an input signal, while when the switch is open the signal is absent.

The device 98 has its input connected by a line 100 to the *r* input bus 74, while the device 102 has an input terminal connected by a line 104 with the *p* input bus 70. The output terminals of the devices 98 and 102 are connected with the input terminals of a device 106. The devices 98, 102 and 106 represent the Boolean function $(r\cdot p)$ within the second square brackets of the above expression.

The output terminal from device 106 is connected with a line 107 which is joined with the *q* input bus 72. The output from the device 106 and line 107 is connected with the output terminal 90 of the device 86, and represents the function within the second square brackets i.e. $[(r\cdot p)Vq]$.

A device 108 has an input connected by a line 110 with the *r* input bus 74, while a device 112 has an input connected by a line 113 with the *q* input bus 72. The outputs from the devices 108 and 112 are respectively delivered to the input terminals of a device 114 which delivers its output to the terminal 90. The device 114 delivers an output signal corresponding with the function in the last square brackets i.e. $[r\cdot q]$.

The output signals delivered to the terminal 90 corresponds to a conjunctive function of the functions within the several square brackets represented by $$\{[(pVq)\cdot r]V[(r\cdot p)Vq]V'[r\cdot q]\}$$

The signal from terminal 90 is delivered to one of the inputs of device 116, while a device 118 has an input connected by a line 120 with the *q* input bus 72. The output from the devices 116 and 118 are delivered to the respective input terminals of the device 122 which delivers its output signal to a bulb 124. The bulb 124 is returned to ground potential. The signal delivered to the bulb 124 corresponds to a conjunctive function with *q* and is the desired function which is to be formulated.

As previously described in connection with the combination of the devices illustrated in FIGURE 2, the computing devices are provided with selected input signals by closing desired combinations of the switches 92, 94 and 96. With the switches set in a predetermined condition, the switches of devices 10 which have their bulbs illuminated are actuated to the open position, this being carried out in a systematic orderly manner with the devices 10 closest to the signal busses 70, 72 and 74 being actuated first before succeeding devices 10 are actuated. If after this operation is carried out, the bulb 124 is illuminated, the selected input signals are true for the formulated Boolean function. If the bulb 124 is not energized, then the selected combination of input signals or propositions are false.

The simplicity of the device 10 of the invention provides a highly inexpensive unit, while allowing a high degree of versatility in their combination with other such devices to form highly complex Boolean functions. Each of the basic Boolean functions of negation, disjunction and conjunction is readily provided as illustrated, so that any compound and complex function may be formulated. This is accomplished by utilizing a plurality of identical basic devices 10. The devices 10 are readily interconnected by detachable connections which are appropriately positioned and spaced, while each of the units is energized by parallel connection with common voltage busses 92, 94. The proper operation of each of the units may readily be tested at the initiation of an operation by providing input signals such as closing the switches 92, 94, 96, at which time all of the bulbs 40 should be energized since the switches 54 should be in their closed positions. The failure to open a switch which should be actuated is readily evident, due to the light from its unshielded or unscreened bulb 40. The use of the devices 10 and their arrangement is highly instructive and educational especially because of its application to Boolean algebra.

It will be obvious to those skilled in the art that the invention may find wide application with appropriate modification to meet various design circumstances, but without substantial departure from the essence of the invention.

What is claimed is:

1. A computing device comprising a signal input terminal and a signal output terminal, a manual switching means having an open position and a closed position for controlling the delivery of a signal to said output terminal, a light bulb for indicating the presence of a signal at said input terminal, said light bulb being connected to said input terminal by permanent electrical connections devoid of switching means, and means inhibiting the radiation of light from said bulb only when said manual switching means is in its said open position.

2. The computing device of claim 1 including a shield connected with said switching means for screening the radiation of light from said bulb when said switching means is in its open position.

3. A computing device comprising a signal input lead, a signal output lead, and first and second voltage supply leads, a bulb connected between said signal input lead and said first voltage supply lead for indicating the presence of a signal on said input lead, and a manual switching means connected between said signal output lead and said second voltage supply lead having an open position and a closed position and adapted to be moved back and forth between said open and closed positions to control the delivery of a signal to said output lead in conformity with the indication of said bulb.

4. The computing device of claim 3 in which said input and output leads are provided with a pair of complementary detachable terminals and said first and second voltage supply leads have respective terminals for detachably connecting across a potential difference.

5. A plurality of computing devices of claim 4 in which the terminal of the output lead of one of said devices detachably connects with the terminal of the input lead of another one of said devices.

6. The computing devices of claim 5 including a mounting board for each device supporting said bulb and swtiching means, said board having a front edge along which are positioned the terminal of said input lead and a rear edge along which are positioned the terminal of said output lead respectively for detachably engaging complementary terminals of proximately positioned devices.

7. The computing devices of claim 5 including a shield connected with the switching means of each of said devices for screening the light of said bulb when said switching means is in its open position.

8. The computing device of claim 3 in which said input lead is provided with a first pair of spaced terminals and said output lead with a second pair of spaced terminals, said first and second pairs of terminals being of the complementary detachable type.

9. The computing device of claim 8 in which the first pair of terminals are spaced and positioned to detachably engage the second pair of terminals of another identical said computing device, and said second pair of terminals are spaced and positioned to detachably engage the first pair of terminals of another identical said computing device.

10. The computing device of claim 9 in which said first and second voltage supply leads have respective terminals for being detachably connected across a potential difference.

11. The computing device of claim 10 including a mounting board supporting said bulb and switching means, said board having a front edge along which are positioned said first pair of terminals of said input line and a rear edge along which are positioned said second pair of terminals of said output line.

12. A plurality of computing devices of claim 11 in which a terminal of the output lead of one of said devices detachably connects with a terminal of the input lead of another one of said devices.

13. The computing devices of claim 12 in which each pair of terminals of said devices are positioned along the edge of its board to provide upper and lower terminals, and the upper and lower terminals of the output lead of a first one of said devices are spaced and positioned to respectively detachably engage the lower and upper terminals of the input leads of respective second and third ones of said devices.

14. The computing devices of claim 13 in which the upper and lower terminals of the input lead of said first one of said devices are spaced and positioned to respectively detachably engage the lower and upper terminals of the output leads of respective fourth and fifth ones of said devices.

15. The computing devices of claim 14 including first and second potential sources having a predetermined voltage difference, first and second busses respectively connected with said first and second potential sources for being respectively connected with the first and second terminals of the supply lines of said devices.

16. The computing devices of claim 15 including a plurality of signal input busses for detachable connection with selected input terminals of said devices, and a plurality of input switches for respectively controlling delivery of input signals to said busses.

17. The computing devices of claim 16 including a shield connected with the swtiching means of each of said devices for screening the light of said bulb when said switching means is in its open position.

References Cited in the file of this patent

UNITED STATES PATENTS

| | | |
|---|---|---|
| 1,285,625 | Cline | Nov. 26, 1918 |
| 2,185,569 | Regnas | Jan. 2, 1940 |
| 2,612,133 | Crawford | Sept. 30, 1952 |
| 2,727,688 | Luhn | Dec. 20, 1955 |
| 2,866,964 | Neidenberg et al. | Dec. 30, 1958 |
| 2,954,460 | Ranfield | Sept. 27, 1960 |
| 2,963,692 | Barter et al. | Dec. 6, 1960 |
| 2,970,303 | Williams | Jan. 31, 1961 |